(12) United States Patent
Tracht et al.

(10) Patent No.: US 8,876,154 B2
(45) Date of Patent: Nov. 4, 2014

(54) VEHICLE SEAT ASSEMBLY HAVING A BACK PANEL MODULE

(71) Applicant: Lear Corporation, Southfield, MI (US)

(72) Inventors: Michael Tracht, Ingolstadt (DE); Florian Reithmeier, Oberding-Schwaig (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/786,574

(22) Filed: Mar. 6, 2013

(65) Prior Publication Data

US 2013/0257120 A1 Oct. 3, 2013

Related U.S. Application Data

(60) Provisional application No. 61/617,727, filed on Mar. 30, 2012.

(51) Int. Cl.
| | | |
|---|---|---|
| *B60R 21/20* | (2011.01) | |
| *B60R 21/207* | (2006.01) | |
| *B60N 2/60* | (2006.01) | |
| *B60N 2/58* | (2006.01) | |

(52) U.S. Cl.
CPC ............ *B60R 21/207* (2013.01); *B60N 2/6009* (2013.01); *B60N 2002/5808* (2013.01)
USPC .................. 280/730.2; 280/728.2; 280/728.3; 297/216.13

(58) Field of Classification Search
CPC B60R 21/207; B60R 21/23138; B60R 21/20; B60R 21/23184; B60R 21/2176; B60R 2021/231; B60R 2021/161; B60R 2013/02; B60R 2013/0293; B60N 2002/58; B60N 2002/5808

USPC ............ 280/730.2, 728.2, 728.3; 297/216.13, 297/216.1

See application file for complete search history.

(56) References Cited

U.S. PATENT DOCUMENTS

| | | | |
|---|---|---|---|
| 5,826,938 A | 10/1998 | Yanase et al. | |
| 5,845,930 A | 12/1998 | Maly et al. | |
| 5,845,932 A * | 12/1998 | Kimura et al. | ............. 280/730.2 |
| 5,890,733 A | 4/1999 | Dillon | |
| 5,893,579 A * | 4/1999 | Kimura et al. | ............. 280/730.2 |
| 6,050,636 A | 4/2000 | Chevallier et al. | |
| 6,095,602 A * | 8/2000 | Umezawa et al. | ......... 297/216.1 |
| 6,155,593 A | 12/2000 | Kimura et al. | |
| 6,386,577 B1 | 5/2002 | Kan et al. | |
| 6,439,597 B1 | 8/2002 | Harada et al. | |
| 6,578,911 B2 | 6/2003 | Harada et al. | |
| 7,100,992 B2 | 9/2006 | Bargheer et al. | |
| 7,134,686 B2 | 11/2006 | Tracht et al. | |

(Continued)

FOREIGN PATENT DOCUMENTS

| | | |
|---|---|---|
| DE | 19915831 | 10/2000 |
| DE | 10238909 | 10/2003 |
| EP | 0782944 | 7/1997 |
| EP | 1868856 | 12/2007 |

*Primary Examiner* — Paul N Dickson
*Assistant Examiner* — Darlene P Condra
(74) *Attorney, Agent, or Firm* — Brooks Kushman P.C.

(57) ABSTRACT

A vehicle seat assembly having a back panel module configured to conceal an air bag module disposed in a seat back. A back panel module may have a back panel and a side panel. The back panel and the side panel may extend along the lateral side of the seat back and form an exterior surface of the back panel module.

20 Claims, 4 Drawing Sheets

(56) References Cited

U.S. PATENT DOCUMENTS

| | | |
|---|---|---|
| 7,195,277 B2 | 3/2007 | Tracht et al. |
| 7,281,735 B2 | 10/2007 | Acker et al. |
| 7,290,793 B2 | 11/2007 | Tracht |
| 7,334,811 B2 * | 2/2008 | Tracht et al. .............. 280/728.3 |
| 7,393,005 B2 | 7/2008 | Inazu et al. |
| 7,540,529 B2 | 6/2009 | Tracht et al. |
| 7,891,701 B2 | 2/2011 | Tracht et al. |
| 8,075,053 B2 | 12/2011 | Tracht et al. |
| 2006/0113764 A1 * | 6/2006 | Tracht ....................... 280/730.2 |
| 2006/0113768 A1 * | 6/2006 | Tracht et al. .............. 280/730.2 |
| 2006/0113773 A1 * | 6/2006 | Tracht ....................... 280/730.2 |
| 2011/0193327 A1 * | 8/2011 | Tracht et al. .............. 280/728.2 |

* cited by examiner

VEHICLE SEAT ASSEMBLY HAVING A BACK PANEL MODULE

CROSS-REFERENCE TO RELATED APPLICATIONS

This application claims the benefit of U.S. provisional Application No. 61/617,727 filed Mar. 30, 2012, the disclosure of which is incorporated in its entirety by reference herein.

TECHNICAL FIELD

This application relates to a vehicle seat assembly having a back panel module.

BACKGROUND

A vehicle seat assembly having a back panel is disclosed in U.S. Pat. No. 7,540,529.

SUMMARY

In at least one embodiment, a vehicle seat assembly is provided. The vehicle seat assembly may include a trim cover, an air bag module, and a back panel module. The trim cover may be disposed along a lateral side of a seat back. The air bag module may be disposed in the seat back. The air bag module may have an air bag and an inflator adapted to provide an inflation gas to inflate the air bag from a stored condition to an inflated condition. The back panel module may be configured to conceal the air bag module. The back panel module may have a back panel having a back panel end and a side panel that extends from the back panel end to the trim cover. The back panel and the side panel may extend along the lateral side of the seat back and both may provide an exterior surface of the back panel module.

In at least one embodiment, a vehicle seat assembly is provided. The vehicle seat assembly may include a seat back having a trim cover that extends along a lateral side of the seat back, an air bag module, and a back panel module. The air bag module may be disposed in the seat back and may have an air bag. The back panel module may include a back panel and/or a side panel. The back panel may extend across a back side of the seat back and along a portion of the lateral side. The back panel may have a first back panel layer. The side panel may have a first end portion that may be mounted on the back panel and a second end portion that may engage the trim cover when the air bag is deflated. The first end portion may be fixedly disposed on the first back panel layer and may be disposed between the back panel and the air bag module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
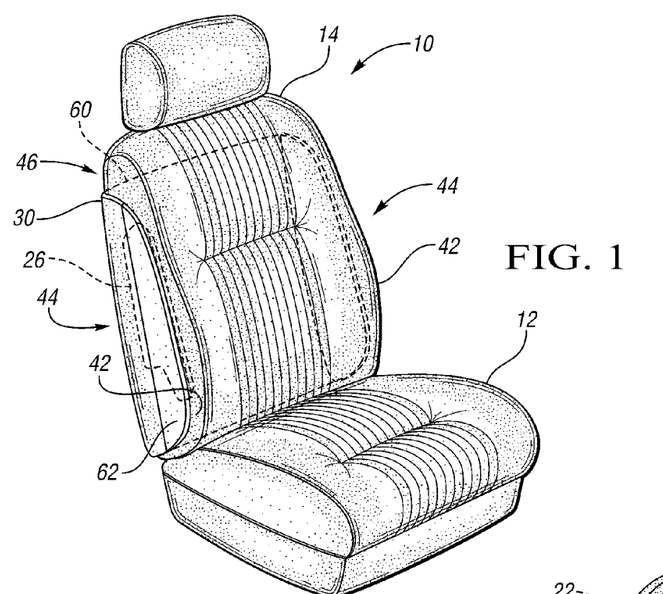
FIG. 1 is a perspective view of a vehicle seat assembly.

Referring to FIG. 1, an exemplary seat assembly 10 is shown. The seat assembly 10 may be provided with a motor vehicle, such as a car or truck. The seat assembly 10 may include a seat bottom 12 and a seat back 14. The seat bottom 12 may be adapted to be mounted to the vehicle. The seat back 14 may be pivotally disposed on the seat bottom 12 such that the seat back 14 may pivot or rotate about an axis of rotation with respect to the seat bottom 12.

Figure 2:
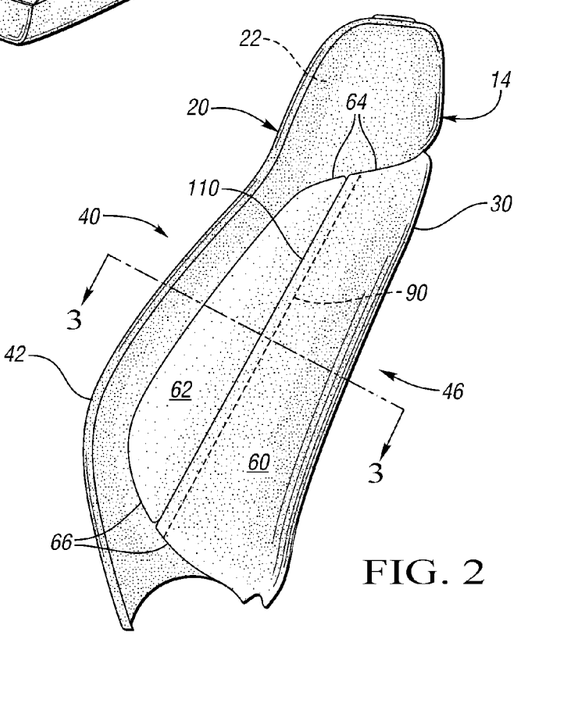
FIG. 2 is a side view of a portion of the vehicle seat assembly shown in FIG. 1.
Figures 3A, 3B:
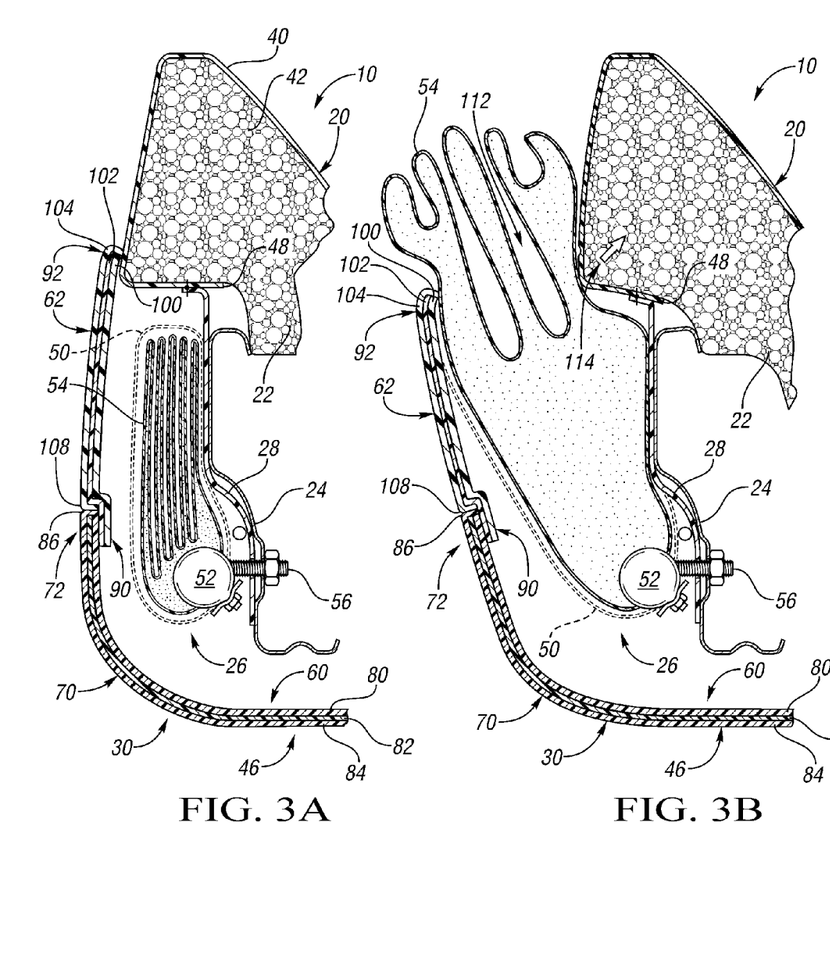
FIGS. 3A and 3B are fragmentary section views of the vehicle seat assembly shown in FIG. 2 illustrating deployment of an air bag.

Referring to FIGS. 2, 3A, and 3B, an example of a seat back 14 is shown in more detail. The seat back 14 may include trim cover 20, a cushion 22, a frame 24, an air bag module 26, a connection panel 28, and a back panel module 30.

The trim cover 20 may form an exterior surface of a portion of the seat back 14. In addition, the trim cover 20 may engage and may at least partially cover or conceal the cushion 22. As is best shown in FIGS. 2 and 3A, the trim cover 20 may extend across a front side 40 of the seat back 14 that may be configured to support a seat occupant. In addition, the trim cover 20 may extend around side bolsters 42 that may protrude forward and may be disposed along the lateral sides 44 of the seat back 14. The trim cover 20 may extend along a lateral side 44 toward a back side 46 of the seat back 14 that may be disposed opposite the front side 40. As is best shown in FIG. 3A, the trim cover 20 may have an trim cover end 48 that may be disposed behind a side bolster 42. The trim cover end 48 may not be fixedly disposed on the cushion 22 and may be spaced apart from the frame 24. The trim cover 20 may be made of any suitable material, such as fabric, vinyl, leather, or combinations thereof.

The cushion 22 may be configured to help support a seat occupant. The cushion 22 may be made of any suitable material, such as molded polymeric material like polyurethane foam. The cushion 22 may be supported by the frame 24 and may be attached to the frame 24 at various locations.

The frame 24 may provide a support structure for the seat back 14 and facilitate mounting of seat back components. The frame 24 may have any suitable configuration and may be made of any suitable material, such as a polymeric material or metal.

The air bag module 26 may be mounted within the seat back 14 and may be configured to deploy an air bag to help protect a seat occupant. An air bag module 26 may be disposed near one or more lateral sides 44 of the seat back 14, such as a left side and/or right side of the seat back 14. The air bag module 26 may include a housing 50, an inflator 52, and an air bag 54.

The housing 50 may configured to receive at least a portion of the air bag 54 when the air bag 54 is deflated. The housing 50 may have a "soft" configuration or a "hard" configuration. In a soft configuration, the housing 50 may include a flexible cover, band, strap, or wrap that may extend around a deflated air bag 54 to hold or package the air bag 54 prior to deployment. In a hard configuration, the housing 50 may be a rigid container, such as a plastic or metal box, that may receive the deflated air bag 54. In either configuration, the housing 50 may open or separate in response to force exerted by the air bag 54 when the air bag 54 is inflated or deployed. A representation of a housing 50 is illustrated with dashed lines in FIGS. 3A and 3B.

The inflator 52 may be configured to provide an inflation gas to the air bag 54 to inflate the air bag 54 from a stored condition to an inflated condition. The inflator 52 may be fixedly positioned with respect to the frame 24. For example, the inflator 52 may be mounted to the frame 24 near the back side 46 of the seat back 14 so as to not impede deployment of the air bag 54. The inflator 52 may be mounted in any suitable manner, such as with a fastener 56 like a stud or bolt. The inflator 52 may be disposed in the housing 50. Alternatively, the inflator 52 may be disposed outside the housing 50 and fluidly connected to the air bag 54 via a tube.

The air bag 54 may be configured to deploy out of the seat back 14. Moreover, the air bag 54 may be configured to cushion the head, thorax, and/or pelvis of the seat occupant when deployed. The air bag 54 may be configured to expand from a deflated or stored condition to an inflated or deployed condition when the inflation gas is provided. In the stored condition, which is shown in FIG. 3A, the air bag 54 may be deflated and folded or stored in the seat back 14 and/or the housing 50. As such, the air bag 54 may be covered or concealed by the back panel module 30 and may not be visible from outside the seat assembly 10. In the deployed condition, the air bag 54 may expand and exit the seat back 14 adjacent to the back panel module 30. The air bag 54 may be positioned between a seat occupant and an interior vehicle surface when fully inflated. In FIG. 3B, the air bag 54 is partially inflated and deployed from the seat back 14.

The air bag 54 may have any suitable configuration and may be made of any suitable material. For example, the air bag 54 may be made of multiple panels that may be assembled in any suitable manner, such as by stitching, bonding, or with an adhesive. Alternatively, the air bag 54 may be integrally formed. Optionally, the air bag 54 may include one or more tethers that control the shape of the air bag 54 upon deployment.

The connection panel 28 may help secure the trim cover 20 to the seat assembly 10 and may help direct the air bag 54 during deployment. Moreover, the connection panel 28 may allow the trim cover 20 to flex or move in response to load forces, such as when the air bag 54 is deployed. In at least one embodiment, the connection panel 28 may extend between the trim cover 20 and the frame 24 and may separate the cushion 22 from the air bag 54 during deployment. For instance, the connection panel 28 may have a first end or first end portion that may be coupled to the trim cover end 48 in any suitable manner, such as with stitching, adhesive, or other bonding technique. The connection panel 28 may also have a second end or second end portion that may be coupled to the frame 24 and/or air bag module 26. For example, the connection panel 28 may be secured to the frame 24 and/or air bag module 26 with the fastener 56 that is used to attach or mount the inflator 52. The connection panel 28 may be spaced apart from the cushion 22 and may be omitted in one or more embodiments.

The back panel module 30 may form a visible exterior portion of the seat back 14. The back panel module 30 may be assembled from multiple components instead of being configured as a single unitary component. In at least one embodiment, the back panel module 30 may include a back panel 60 and at least one side panel 62 that may both form or provide an exterior surface of the back panel module 30 that may be face away from the air bag module 26 and that may be visible from outside the seat assembly 10. The back panel 60 and side panel 62 may extend between an upper side 64 and a lower side 66 of the back panel module 30 that may be disposed opposite the upper side 64 as is best shown in FIG. 2.

As is best shown in FIGS. 1 and 2, the back panel 60 may extend across the back side 46 of the seat back 14. In addition, the back panel 60 may wrap around or extend forward along a portion of the lateral sides 44 of the seat back 14. For example, the back panel 60 may have a curved portion 70 and a back panel end 72. As is best shown in FIGS. 3A and 3B, the curved portion 70 may be spaced apart from the air bag module 26 and may be configured to flex but not sever to facilitate deployment of the air bag 54 as will be discussed in more detail below. The back panel 60 and curved portion 70 may be disposed rearward of the deployment path of the air bag 54. As such, the air bag 54 may not impact the back panel 60 and/or curved portion 70 upon deployment. Moreover, since the back panel 60 may not be impacted by a portion of the air bag module 26, such as a housing 50 and/or deploying air bag 54, the back panel 60 may be made of a different or less expensive material or fewer layers of material than the side panel 62 in one or more embodiments. The back panel end 72 may be disposed adjacent to a side panel 62. The back panel end 72 may be spaced apart from and may be generally disposed over a portion the air bag module 26. In FIGS. 3A and 3B, the back panel end 72 is shown overlapping the side panel 62. Alternatively, the side panel 62 may overlap the back panel end 72 in one or more embodiments.

The back panel 60 may be attached to the seat assembly 10 in any suitable manner, such as with hooks, fasteners, and/or an adhesive. In addition, the back panel 60 may have one or more layers. The back panel 60 may have a first back panel layer 80, a second back panel layer 82, and a third back panel layer 84.

The first back panel layer 80 may be a substrate that faces toward the air bag module 26. As such, the first back panel layer 80 may define an interior surface of the back panel 60 that may be disposed opposite a visible exterior surface. The first back panel layer 80 may be spaced apart from the air bag module 26 and may not be visible when the air bag 54 is deflated and stored in the seat back 14. The first back panel layer 80 may be configured to flex and may be formed of any suitable material, such as a polymeric material like polypropylene or wood composite.

The second back panel layer 82, if provided, may be disposed on the first back panel layer 80 on a side that faces away from the air bag module 26 or opposite the interior surface. The second back panel layer 82 may be coextensive with the first back panel layer 80 and may be an exterior surface of the back panel 60 if the third back panel layer 84 is not provided. In such a configuration, the second back panel layer 82 may provide a desired surface finish, color, or appearance and may conceal the first back panel layer 80.

The third back panel layer 84, if provided, may be disposed on the second back panel layer 82 on a side that is disposed opposite the first back panel layer 80. The third back panel layer 84 may be configured as a trim material like vinyl, fabric, or leather and may be affixed to or continuously bonded to the second back panel layer 82 in one or more embodiments. The third back panel layer 84 may have an end portion 86 that may cover or engage ends of the first back panel layer 80 and/or second back panel layer 82. The end portion 86 may extend inward or toward the air bag module 26. As such, the third back panel layer 84 may cover and conceal the first and second back panel layers 80, 82 and may extend toward and may engage the side panel 62.

The side panel 62 may extend from the back panel 60 to the trim cover 20. As such, the side panel 62 may be visible from outside the seat assembly 10. Moreover, the side panel 62 may be structured to withstand load forces exerted by the air bag 54 upon the side panel 62 during deployment such that the side panel 62 does not fragment or shatter. As such, the side panel 62 may be configured not to flex or to flex less than the back panel 60 when the air bag 54 is deployed.

The side panel 62 may cooperate with the back panel 60 to conceal the air bag module 26 prior to air bag deployment. For example, the side panel 62 may extend further forward or toward the front side 40 of the seat assembly 10 than the air bag module 26 to conceal the air bag module 26 when the air bag 54 is in the stored condition.

The side panel 62 may be spaced apart from the air bag module 26 such that a gap is formed between the side panel 62 and the air bag module 26. The side panel 62 may have a first end portion 90 and a second end portion 92.

Figure 3C:
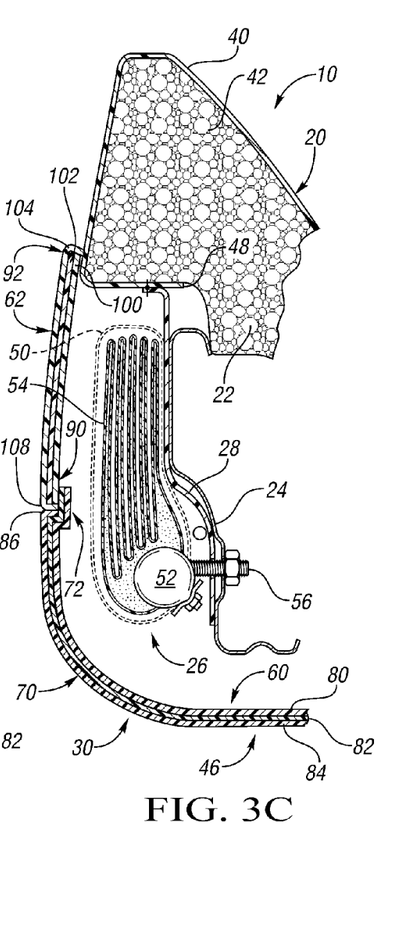
FIG. 3C is a fragmentary section view of another embodiment of a vehicle seat assembly.

The first end portion 90 may be coupled to and may engage the back panel 60. In the embodiment shown, the first end portion 90 is disposed between the back panel 60 and the air bag module 26 such that the first end portion 90 engages and is attached to the interior side of the first back panel layer 80 that faces toward the air bag module 26. Alternatively, the first end portion 90 may overlap the back panel end 72 as shown in FIG. 3C. The first end portion 90 may be attached to the first back panel layer 80 without a separate fastener, such as by vibration welding, ultrasonic welding, an adhesive, or interlocking engagement features such as described below. In addition, the first end portion 90 may be attached or fixedly disposed on the back panel 60 or first back panel layer 80 continuously between the upper side 64 and the lower side 66. Moreover, the first end portion 90 may be disposed between the back panel 60 and the air bag module 26 such that the first end portion 90 is not visible from outside the seat assembly 10.

The second end portion 92, or distal end, may be disposed opposite the first end portion 90. The second end portion 92 may be disposed proximate and may engage the trim cover 20 when the air bag 54 is in the stored condition. Moreover, the second end portion 92 may not be attached or coupled to the trim cover 20 to permit the back panel module 30 to move away from the trim cover 20 to facilitate deployment of the air bag 54. The second end portion 92 may be angled toward the trim cover 20 and may compress the cushion 22 to provide a gap-free appearance.

The side panel 62 may have one or more layers. In the embodiment shown in FIG. 3A, the side panel 62 may have a first side panel layer 100, a second side panel layer 102, and a third side panel layer 104.

Figure 8:
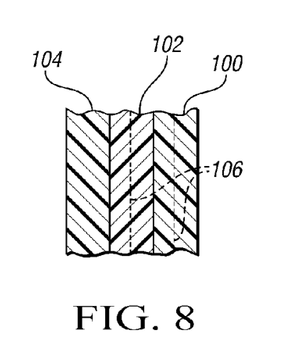
FIG. 8 is a fragmentary section view of a side panel having at least one reinforcement layer.

The first side panel layer 100 may be a substrate that faces toward the air bag module 26. The first side panel layer 100 may be spaced apart from the air bag module 26 and may not be visible when the air bag 54 is deflated and stored in the seat back 14. The first side panel layer 100 may be impacted by the air bag 54 when the air bag 54 is inflated. As is shown in FIG. 8, the first side panel layer 100 may include one or more embedded reinforcement layers 106, such as a textile, mesh, netting, sheet metal, carbon fiber, or glass mat that may reinforce the first side panel layer 100 to help withstand air bag impact forces. In addition, fibers such as "endless" fibers having a length/diameter ratio greater than 10000 or having a length that is at least as long as the part itself may be used. One or more reinforcement layers may be embedded in a polymeric material and/or embedded under pressure in one or more embodiments. Moreover, the first side panel layer 100 may be made of a different material than the first back panel layer 80 in one or more embodiments.

The second side panel layer 102, if provided, may be disposed on the first side panel layer 100 on a side that faces away from the air bag module 26. The second side panel layer 102 may be coextensive with the first side panel layer 100 and may be an exterior surface of the side panel 62 if the third side panel layer 104 is not provided. In such a configuration, the second side panel layer 102 may provide a desired surface finish, color, or appearance and may conceal the first side panel layer 100. In the embodiment shown in FIGS. 3A and 3B, the second side panel layer 102 may engage and may be attached to the first back panel layer 80. As is shown in FIG. 8, the second side panel layer 102 may include one or more embedded reinforcement layers 106 as described above. One or more reinforcement layers may be embedded in a polymeric material in one or more embodiments.

The third side panel layer 104, if provided, may be disposed on the second side panel layer 102 on a side that is disposed opposite the first side panel layer 100. The third side panel layer 104 may be configured as trim material like vinyl, fabric, or leather and may be affixed to or continuously bonded to the second side panel layer 102 in one or more embodiments. In at least one embodiment, the third side panel layer 104 may wrap around or cover the ends of the first and second side panel layers 100, 102 such that they are not visible prior to airbag deployment. In addition, the third side panel layer 104 may extend along a side of the first side panel layer 100 that faces toward the air bag module 26. The third side panel layer 104 may have an end portion 108 that may cover or engage ends of the first side panel layer 100 and/or second side panel layer 102. The end portion 108 may extend inward or toward the air bag module 26. In addition, the end portion 108 may engage the end portion 86 of the back panel 60 if provided. As such, the third side panel layer 104 may cover and conceal the first and second side panel layers 100, 102 and may extend toward and may engage the back panel 60.

As is best shown in FIG. 2, a seam 110 may extend between the upper side 64 and the lower side 66 of the back panel. The seam 110 may denote the boundary or interface between the back panel 60 and the side panel 62. For instance, the seam 110 may be defined where the end portion 86 of the back panel 60 engages the end portion 108 of the side panel 62. The seam 110 may be substantially linear in one or more embodiments.

Referring to FIGS. 3A and 3B, an exemplary air bag deployment sequence is shown.

In FIG. 3A, the air bag 54 is shown prior to inflation. Prior to inflation, the air bag 54 may be folded and stored within the seat back 14 under the back panel module 30. In addition, the back panel module 30 may be in an initial position in which the second end portion 92 of the side panel 62 engages the trim cover 20. As such, the air bag 54 may not engage the back panel module 30 or may not exert a load force on the back panel module 30 that causes the side panel 62 to flex outwardly and disengage the trim cover 20.

In FIG. 3B, the air bag 54 is partially inflated. As the air bag 54 is inflated, it exerts force on and exits the housing 50. As additional inflation gas is provided, the air bag 54 may expand toward the back panel module 30. Force exerted by the air bag 54 may cause the back panel module 30 to flex such that the second end portion 92 moves away from the trim cover 20. A gap 112 may then be formed between the second end portion 92 and the trim cover 20 through which the air bag 54 deploys. As the air bag 54 continues to inflate, it may continue to exert force on the back panel module 30. As a result, the second end portion 92 may move further away from the trim cover 20 and cushion 22, thereby increasing the size of the gap 112. The air bag 54 may expand into and through the gap 112 and toward a target position between the seat occupant and an interior vehicle surface. In addition, the air bag 54 may also exert force on the cushion 22 as it deploys. In the embodiment shown, the air bag 54 at least partially compresses a corner portion 114 of the cushion 22 toward the front side 40 of the seat assembly 10 in the direction indicated by the arrow. The corner portion 114 may be concealed by the second end portion 92 when the air bag 54 is in the stored condition.

Figure 4:
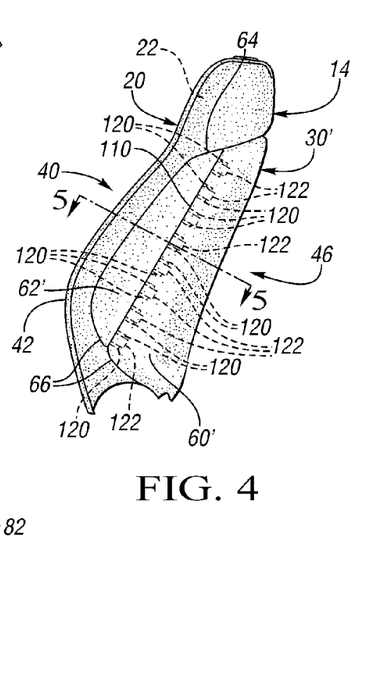
FIG. 4 is a side view of a portion of another embodiment of a vehicle seat assembly.
Figure 5A:
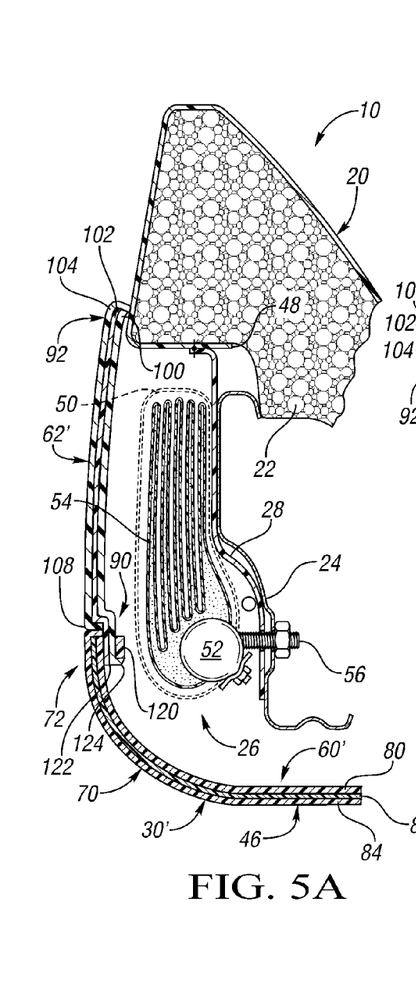
FIGS. 5A and 5B are fragmentary section views of the vehicle seat assembly shown in FIG. 4 illustrating deployment of an air bag.
Figure 5B:
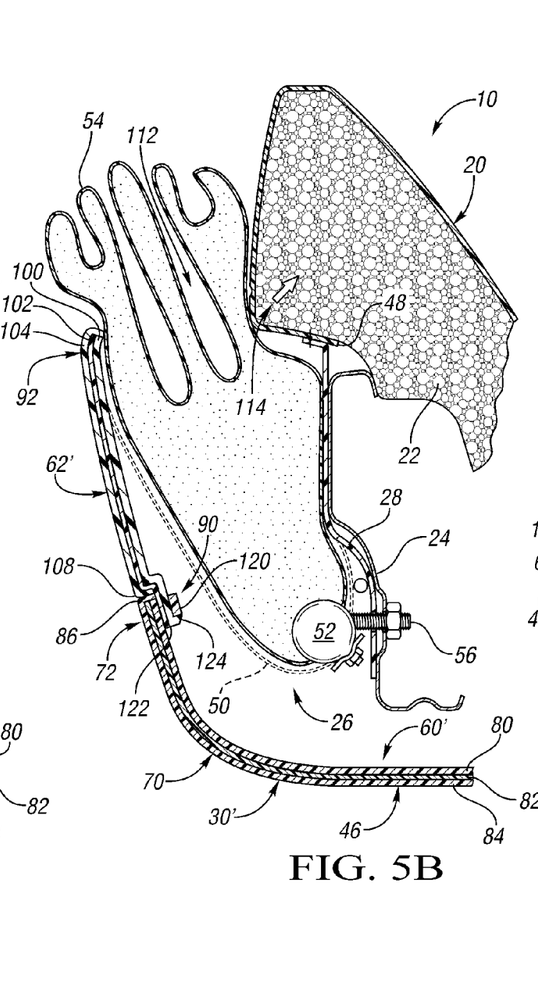

Referring to FIGS. 4, 5A, and 5B, another embodiment of a back panel module 30' is shown. In this embodiment, the back panel module 30' has a back panel 60' and a side panel 62'. The back panel 60' is shown overlapping the side panel 62', but it is also contemplated that the side panel 62' may overlap the back panel 60'. The back panel 60' may have a set of mounting features 120 that may mate with corresponding members of a set of engagement features 122 on the side panel 62'. As is best shown in FIG. 4, mating pairs of mounting and engagement features 120, 122 may be arranged generally along the seam 110 to facilitate attachment of the side panel 62' to the back panel 60'. The pairs of mounting and engagement features 120, 122 may be spaced apart from each other and may have male and female configurations. In the embodiment shown, the mounting features 120 have a female configuration that may extend from the first side panel layer 100 toward the air bag module 26 and may define an opening that receives an engagement feature 122. The engagement features 122 may have a male configuration, such as a snap tab, that may be inserted through the opening of the mounting feature 120 and may have a barb 124 that engages and secures the engagement feature 122 to the mounting feature 120. Alternatively, one or more mounting features 120 may have a male configuration and a corresponding engagement feature 122 may have a female configuration in one or more embodiments. The engagement features 122 may be formed by the first side panel layer 100 and/or the second side panel layer 102 in one or more embodiments.

Figures 6, 7B:
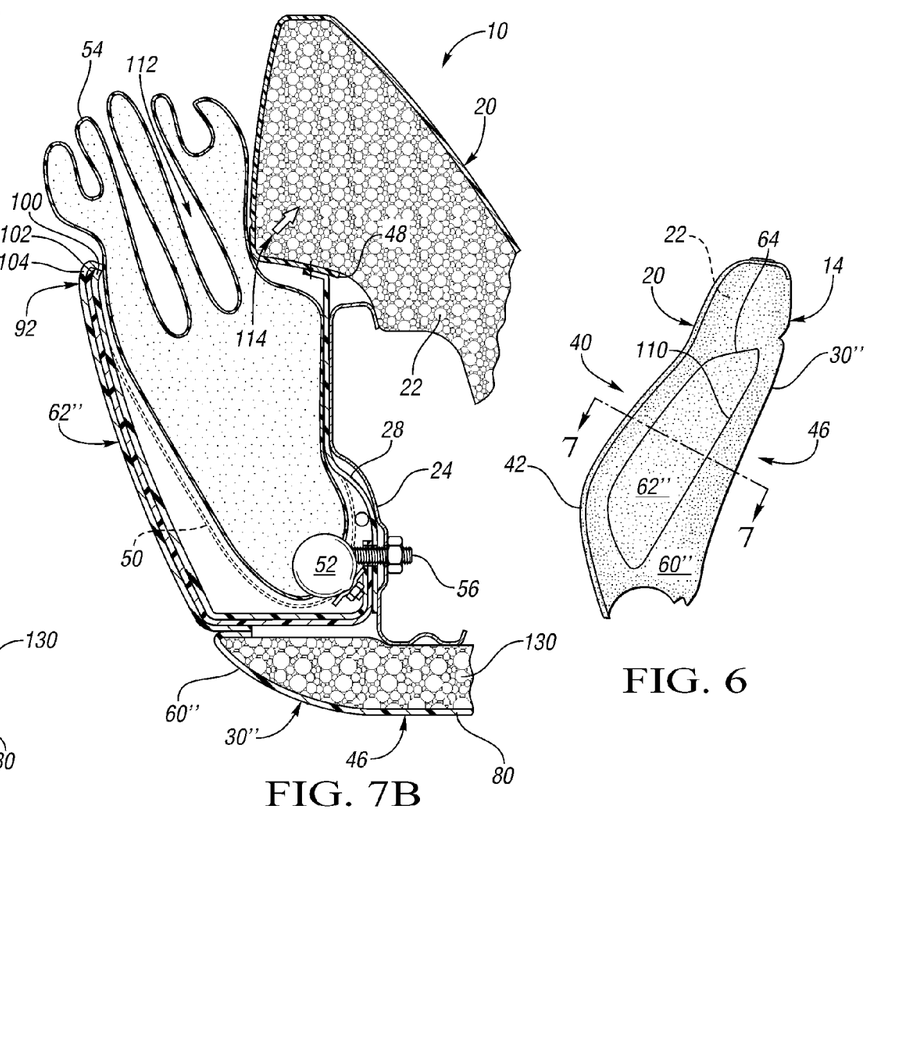
FIG. 6 is a side view of a portion of another embodiment of a vehicle seat assembly.
FIGS. 7A and 7B are fragmentary section views of the vehicle seat assembly shown in FIG. 6 illustrating deployment of an air bag.
Figure 7A:
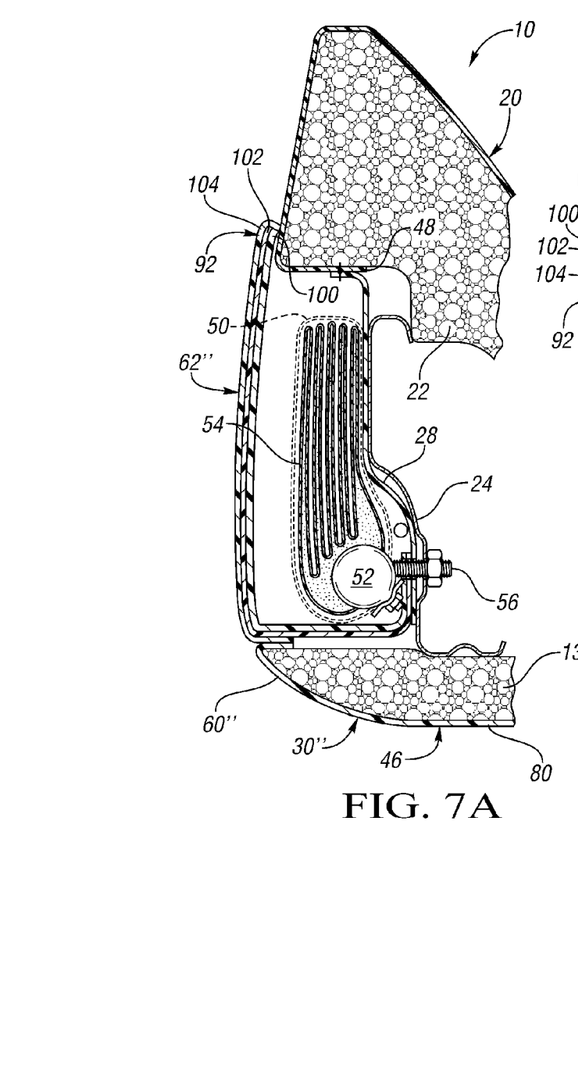

Referring to FIGS. 6, 7A, and 7B, another embodiment of a back panel module 30" is shown. In this embodiment, the back panel module 30" may have a back panel 60" and a side panel 62". The back panel 60" may be disposed rearward of the air bag module 26 and may be made of one or more flexible panels or layers. The back panel 60" may also form at least a portion of a lateral side of the seat back 14 and may surround or extend around the side panel 62" as is best shown in FIG. 6. The back panel 60" may or may not be coupled or fastened to the side panel 62". In addition, the back panel 60" may cover and may engage a back panel cushion 130 that may provide a soft padded surface along the rear side of the seat back 14. The side panel 62" may be disposed adjacent to the back panel 60" and may include a plurality of layers, such as a first side panel layer 100, a second side panel layer 102, and a third side panel layer 104. At least one of the layers may be coupled to the frame 24 to facilitate mounting of the side panel 62" to the seat back 14. In the embodiment shown in FIGS. 7A and 7B, the second side panel layer 102 may extend between the air bag module 26 and the back panel cushion 130 and may be mounted to the frame 24 and/or side air bag module 26. For example, the first side panel layer 100 and/or second side panel layer 102 may extend between and may engage the frame 24 and the housing 50 of the air bag module 26 and may be secured to the frame 24 and/or air bag module 26 with the fastener 56 that is used to attach or mount the inflator 52.

The seat assemblies described herein may permit an air bag to deploy without severing stitches that join one or more trim panels. In addition, the seat assemblies may permit an air bag to deploy without having to compress a seat cushion to create an opening suitable for air bag deployment. As a result, air bag deployment time may be reduced. Moreover, the seat assemblies may reduce manufacturing costs in that additional manufacturing steps associated with creating an air bag deployment path through the trim cover and/or cushion may be eliminated. In addition, a back panel may be made to be lighter than a side panel, which may help reduce weight as a back panel may be many times larger than a side panel in one or more embodiments. Moreover, a back panel may be made of less expensive material(s) than a side panel, which may help reduce associated costs. Furthermore, tearing of foam, trim covers, and/or trim cover stitching when an air bag is deployed may be reduced or eliminated, which may reduce seat repair costs after an air bag is deployed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
a trim cover disposed along a lateral side of a seat back;
an air bag module disposed in the seat back, the air bag module having an air bag and an inflator adapted to provide an inflation gas to inflate the air bag from a stored condition to an inflated condition; and
a back panel module configured to conceal the air bag module, the back panel module having a back panel having a back panel end and a set of mounting features that extend toward the air bag module and a side panel that extends from the back panel end to the trim cover and that has a set of engagement features that are disposed between the back panel and the air bag module, wherein each member of the set of mounting features engages a different member of the set of engagement features to fixedly mount the side panel to the back panel;
wherein the back panel and the side panel extend along the lateral side of the seat back and each provide an exterior surface of the back panel module.

2. The vehicle seat assembly of claim 1 wherein the side panel has a first end portion that is fixedly disposed on the back panel between the back panel and the air bag module.

3. The vehicle seat assembly of claim 2 wherein the side panel further comprises a second end portion disposed opposite the first end portion, wherein the second end portion engages but is not fixedly disposed on the trim cover when the air bag is in the stored condition.

4. The vehicle seat assembly of claim 3 wherein the back panel includes a curved portion that flexes but does not sever to create a gap between the second end portion and the trim cover through which the air bag deploys when the air bag is inflated.

5. The vehicle seat assembly of claim 2 wherein the back panel module has an upper side and a lower side, wherein the side panel is fixedly disposed on the back panel between the upper and lower sides.

6. The vehicle seat assembly of claim 5 wherein the back panel module has a seam defined by the back panel and side panel that extends substantially linearly between the upper and lower sides.

7. The vehicle seat assembly of claim 1 wherein the side panel includes at least one embedded reinforcement layer.

8. A vehicle seat assembly comprising:
  a trim cover disposed along a lateral side of a seat back, wherein the trim cover has a trim cover end that is disposed adjacent to and detached from a cushion, wherein the trim cover end is fixedly coupled to a connection panel that is attached to a frame of the seat back;
  an air bag module disposed in the seat back, the air bag module having an air bag and an inflator adapted to provide an inflation gas to inflate the air bag from a stored condition to an inflated condition; and
  a back panel module configured to conceal the air bag module, the back panel module having a back panel having a back panel end and a side panel that extends from the back panel end to the trim cover;
  wherein the back panel and the side panel extend along the lateral side of the seat back and each provide an exterior surface of the back panel module.

9. The vehicle seat assembly of claim 8 wherein the back panel has a set of mounting features and the side panel has a set of engagement features, wherein each member of the set of mounting features engages a different member of the set of engagement features to fixedly mount the side panel to the back panel.

10. The vehicle seat assembly of claim 8 wherein the air bag module engages the side panel but not the back panel when the air bag is inflated.

11. A vehicle seat assembly comprising:
  a seat back having a trim cover that extends along a lateral side of the seat back;
  an air bag module that is disposed in the seat back and that has an air bag; and
  a back panel module that includes:
    a back panel that extends across a back side of the seat back and along a portion of the lateral side, the back panel having a first back panel layer, and
    a side panel having a first end portion that is coupled to the back panel and a second end portion that engages the trim cover but is not attached to the trim cover when the air bag is deflated;
  wherein the first end portion is fixedly disposed on the first back panel layer and disposed between the back panel and the air bag module.

12. The vehicle seat assembly of claim 11 wherein the side panel includes a first side panel layer, wherein the first side panel layer engages the trim cover.

13. The vehicle seat assembly of claim 12 where the side panel includes a second side panel layer, wherein the second side panel layer engages the first back panel layer.

14. The vehicle seat assembly of claim 13 wherein the first side panel layer is spaced apart from the first back panel layer by the second side panel layer.

15. The vehicle seat assembly of claim 13 wherein the first side panel layer engages the first back panel layer.

16. The vehicle seat assembly of claim 13 wherein the side panel includes a third side panel layer that extends across the second side panel layer, wherein the third side panel layer includes an end portion that extends between the back panel and the first side panel layer and toward the air bag module.

17. The vehicle seat assembly of claim 16 wherein the back panel includes a second back panel layer disposed between the first back panel layer and a third back panel layer that extends across the second back panel layer, wherein the third back panel layer includes an end portion that extends toward the air bag module.

18. The vehicle seat assembly of claim 17 wherein the end portion of the third back panel layer engages the side panel.

19. The vehicle seat assembly of claim 11 wherein the side panel is mounted to a frame of the seat back.

20. The vehicle seat assembly of claim 19 wherein the trim cover has a trim cover end that is disposed adjacent to and detached from a cushion, wherein the trim cover end is fixedly coupled to a connection panel that is attached to the frame and that engages the side panel.

\* \* \* \* \*